(12) United States Patent
Seemann et al.

(10) Patent No.: US 12,344,100 B2
(45) Date of Patent: Jul. 1, 2025

(54) DEVICE AND METHOD FOR PROVIDING OPERATING ENERGY FOR AN AUXILIARY DRIVE FOR AN ELECTRIC VEHICLE, AND ELECTRIC VEHICLE

(71) Applicant: ZF FRIEDRICHSHAFEN AG, Friedrichshafen (DE)

(72) Inventors: Frank Seemann, Euerbach (DE); Andre Ehrsam, Bergrheinfeld (DE); Martin Mach, Plzen (CZ); Zbynek Stepan, Plzen (CZ); Vladimir Dvorak, Plzen (CZ); Gabriel Scherer, Deggenhausertal (DE); Matthias Engicht, Bodman-Ludwigshafen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 246 days.

(21) Appl. No.: 18/017,356

(22) PCT Filed: Jul. 22, 2021

(86) PCT No.: PCT/EP2021/070559
§ 371 (c)(1),
(2) Date: Jan. 20, 2023

(87) PCT Pub. No.: WO2022/018215
PCT Pub. Date: Jan. 27, 2022

(65) Prior Publication Data
US 2023/0294518 A1    Sep. 21, 2023

(30) Foreign Application Priority Data
Jul. 23, 2020   (DE) .................... 10 2020 209 314.8

(51) Int. Cl.
*B60L 1/00*     (2006.01)
*B60L 53/20*    (2019.01)

(52) U.S. Cl.
CPC ............... *B60L 1/003* (2013.01); *B60L 1/006* (2013.01); *B60L 53/20* (2019.02); *B60L 2200/40* (2013.01); *B60L 2210/40* (2013.01)

(58) Field of Classification Search
CPC .......... B60L 1/003; B60L 53/20; B60L 1/006; B60L 2200/40; B60L 2210/40
See application file for complete search history.

(56) References Cited

U.S. PATENT DOCUMENTS

| 2004/0060752 A1* | 4/2004 | Oshida | ..................... B60K 6/52 |
| | | | 180/65.285 |
| 2009/0166108 A1* | 7/2009 | Gross | ..................... B60L 50/62 |
| | | | 180/65.21 |

(Continued)

FOREIGN PATENT DOCUMENTS

| DE | 202017104921 | 11/2018 |
| EP | 2733007 | 5/2014 |

(Continued)

OTHER PUBLICATIONS

Office Action for corresponding German Patent Application No. DE 10 2020 209 314.8.

(Continued)

*Primary Examiner* — Naeem Taslim Alam
(74) *Attorney, Agent, or Firm* — COZEN O'CONNOR

(57) ABSTRACT

A device for providing operating energy for an auxiliary drive for an electric vehicle. The device has a battery interface and an inverter, which is designed to convert, for a boost function, a direct voltage into an alternating voltage. The device also has a switch apparatus, which includes: —a switch terminal, which connects the switch apparatus to the inverter; —an auxiliary interface for connecting the device to the auxiliary drive; and —a charging interface for feeding electrical energy into the device. The switch apparatus is (Continued)

designed to connect the charging interface to the switch terminal and to the auxiliary interface by a switching signal.

10 Claims, 4 Drawing Sheets

(56) References Cited

U.S. PATENT DOCUMENTS

| | | | | |
|---|---|---|---|---|
| 2010/0242481 A1* | 9/2010 | Shamoto | ................ | B60L 1/003 |
| | | | | 180/65.22 |
| 2013/0138279 A1* | 5/2013 | Shi | .......................... | B60L 58/20 |
| | | | | 701/22 |
| 2020/0254900 A1* | 8/2020 | Kumar | ..................... | H02P 5/74 |
| 2021/0354592 A1* | 11/2021 | Zuo | .................... | H01M 10/615 |
| 2023/0151584 A1* | 5/2023 | Andreuccetti | .......... | F15B 19/00 |
| | | | | 414/685 |

FOREIGN PATENT DOCUMENTS

| | | |
|---|---|---|
| EP | 3037297 | 6/2016 |
| WO | WO 2011080393 | 7/2011 |
| WO | WO 2011109050 | 9/2011 |

OTHER PUBLICATIONS

Hadjidemetriou, Lenos et al. "A Synchronization Method for Single-Phase Grid-Tied Inverters" IEEE Transactions on Power Electronics, Institute of Electrical Engineers, USA, Mar. 3, 2016.

\* cited by examiner

DEVICE AND METHOD FOR PROVIDING OPERATING ENERGY FOR AN AUXILIARY DRIVE FOR AN ELECTRIC VEHICLE, AND ELECTRIC VEHICLE

CROSS REFERENCE TO RELATED APPLICATIONS

This is a U.S. national stage of Application No. PCT/EP2021/070559 filed Jul. 22, 2021. Priority is claimed on German Application No. DE 10 2020 209 314.8 filed Jul. 23, 2020 the content of which is incorporated herein by reference.

BACKGROUND OF THE INVENTION

1. Field of the Invention

The present disclosure relates to an apparatus for supplying operating energy for an auxiliary drive for an electric vehicle, to an electric vehicle, and to a method for supplying operating energy for an auxiliary drive for an electric vehicle.

2. Description of Related Art

As part of a move toward greater environmental friendliness, electrified driving has become more and more important in the industry, with the aim of driving not just passenger cars electrically but also commercial vehicles.

SUMMARY OF THE INVENTION

Against this background, the present invention provides an improved apparatus for supplying operating energy for an auxiliary drive for an electric vehicle, an improved electric vehicle, and an improved method for supplying operating energy for an auxiliary drive for an electric vehicle according to the main claims. Advantageous embodiments can be found in the dependent claims and the following description.

The possibility is created by the approach proposed here of supplying current to stationarily operated applications of an electrified vehicle, advantageously a commercial vehicle, and using the vehicle battery for this purpose only when required. Such a reserve of energy can thus be maintained and ensured in the vehicle battery.

An apparatus for supplying operating energy for an auxiliary drive for an electric vehicle is proposed. The apparatus here has a battery interface for connecting the apparatus to a vehicle battery of the electric vehicle, and an inverter with a first connector for connecting the inverter to the battery interface, and a second connector. The inverter is designed to convert direct voltage present at the first connector into an alternating voltage for a boost function in response to a boost signal and to supply it to the second connector. The apparatus furthermore has a switch device with a switch connector which connects the switch device to the second connector of the inverter, and an auxiliary interface for connecting the apparatus to the auxiliary drive. The switch device has a charging interface for feeding electrical energy into the apparatus, wherein the switch device is designed to connect the charging interface to the switch connector and to the auxiliary interface using a switch signal. The apparatus has a control device designed to supply the boost signal for the boost function when a current energy value of the electrical energy present at the charging interface is less than a target value for the operating energy. The control device is furthermore designed to supply an idle signal to deactivate the inverter when the current energy value of the electrical energy present at the charging interface is greater than or equal to the target value for the operating energy.

The apparatus can, for example, be part of an electric vehicle or be installed in an electric vehicle. The electric vehicle can take the form of, for example, an electrified commercial vehicle. A commercial vehicle can, for example, be an excavator or a truck which has, for example, a crane trailer. The auxiliary drive can be designed, for example, to supply functionality that goes beyond the locomotion of the vehicle. The auxiliary drive can be used, for example, to drive an excavator shovel or a crane of the electric vehicle. The switch device can have, for example, a plurality of switches which can be opened and closed, for example, depending on a desired function. For example, an auxiliary function of the electric vehicle, such as driving the crane, can be effected via the auxiliary drive. The inverter can have, for example, a bidirectional design. This means that it advantageously can convert a direct voltage into an alternating voltage and additionally or alternatively an alternating voltage into a direct voltage. During the boost function, an additional amount of energy can be supplied, for example from the vehicle battery, to the auxiliary interface. The electrical energy can advantageously be routed directly to the auxiliary interface from the charging interface using the idle signal such that the auxiliary drive is advantageously fed directly via a power source connected to the charging interface. It is advantageously therefore not necessary to install a particularly large vehicle battery in the electric vehicle such that costs, on the one hand, and structural space in the electric vehicle, on the other hand, can be saved.

According to one aspect of the invention, the control device can be designed to supply the boost signal when a current speed of the auxiliary drive is less than a target value of the auxiliary drive. According to one aspect of the invention, the control device can be designed to supply the boost signal when a current speed of the auxiliary drive is less than a target speed of the auxiliary drive. The current speed can advantageously be detected, for example, by a tachometer such that, for example, more power can be supplied to the auxiliary interface in order, for example, to correct the current speed of the auxiliary drive.

According to one aspect of the invention, the switch device can have a first switch for connecting the switch connector to the charging interface, and a second switch for connecting the switch connector to the auxiliary interface. The operating energy can advantageously be routed via the shortest route to the auxiliary interface by the switch device by the switches.

The switch device can furthermore be designed to close the first switch and the second switch using the switch signal. As a result, a power circuit can advantageously be closed.

The control device can moreover be designed to read a phase signal that represents a phase position of a charging current present at the charging interface. The control device can furthermore be designed to supply the boost signal using the phase signal. The boost signal advantageously controls the inverter in such a way that the alternating voltage converted by the inverter runs synchronously with the charging current. As a result, it is advantageously possible to prevent the currents from influencing each other unfavorably.

According to one aspect of the invention, the switch device can have a current-supply interface for supplying current to an appliance coupled to the current-supply interface. The switch device can be designed to connect the switch connector to the charging interface, the auxiliary interface, and additionally or alternatively the current-supply interface using the switch signal. The current-supply interface can, for example, take the form of a socket outlet.

According to one aspect of the invention, the inverter, the switch device, and the control device can be arranged in a common housing. As a result, both the inverter and the switch device are advantageously arranged in the electric vehicle so that they are protected from, for example, environmental influences.

According to one aspect of the invention, the inverter can be designed to convert alternating voltage present at the second connector into a direct voltage in response to a charging signal and to supply it to the first connector for a charging function of the vehicle battery. As a result, the vehicle battery can advantageously be charged.

The switch device can have a drive interface for supplying current to a drive motor, connected to the drive interface, of the electric vehicle. The switch device can here be designed to connect the switch connector to the drive interface, the auxiliary interface, or the charging interface using the switch signal. As a result, the vehicle can advantageously be set in motion, for example can travel forward or backward.

An electric vehicle is moreover proposed with an electric vehicle with an apparatus in an abovementioned variant, the vehicle battery connected to the battery interface, and the auxiliary drive connected to the auxiliary interface. The electric vehicle can take the form of, for example, an electrified commercial vehicle, for example a truck.

A method is furthermore proposed for supplying operating energy for an auxiliary drive for an electric vehicle in an abovementioned variant with an apparatus in one of the abovementioned variants. The method here comprises a step of converting a direct voltage present at the first connector into an alternating voltage for the boost function in response to the boost signal, and a step of supplying the alternating voltage to the second connector. The method furthermore comprises a step of connecting the switch connector to the second connector, to the auxiliary interface, and additionally or alternatively to the charging interface, using the switch signal. The method comprises a step of supplying the boost signal for the boost function when a current energy value of the electrical energy present at the charging interface is less than a target value for the operating energy, and a step of supplying the idle signal for deactivating the inverter when the current energy value of the electrical energy present at the charging interface is greater than or equal to the target value for the operating energy.

The auxiliary drive can advantageously be actuated by the method, for example without using energy stored in the vehicle battery, as long as the energy value of the electrical energy is equal to or greater than the target value. As a result, it is advantageously possible for a travel range of the electric vehicle to be ensured.

BRIEF DESCRIPTION OF THE DRAWINGS

The invention is explained in detail by way of example with the aid of the attached drawings, in which.

DETAILED DESCRIPTION OF THE PRESENTLY PREFERRED EMBODIMENTS

The same or similar reference signs are used in the following description of preferred exemplary embodiments of the present invention for the elements which are illustrated in the different drawings and act in a similar fashion, the description of these elements not being repeated.

Figure 1:
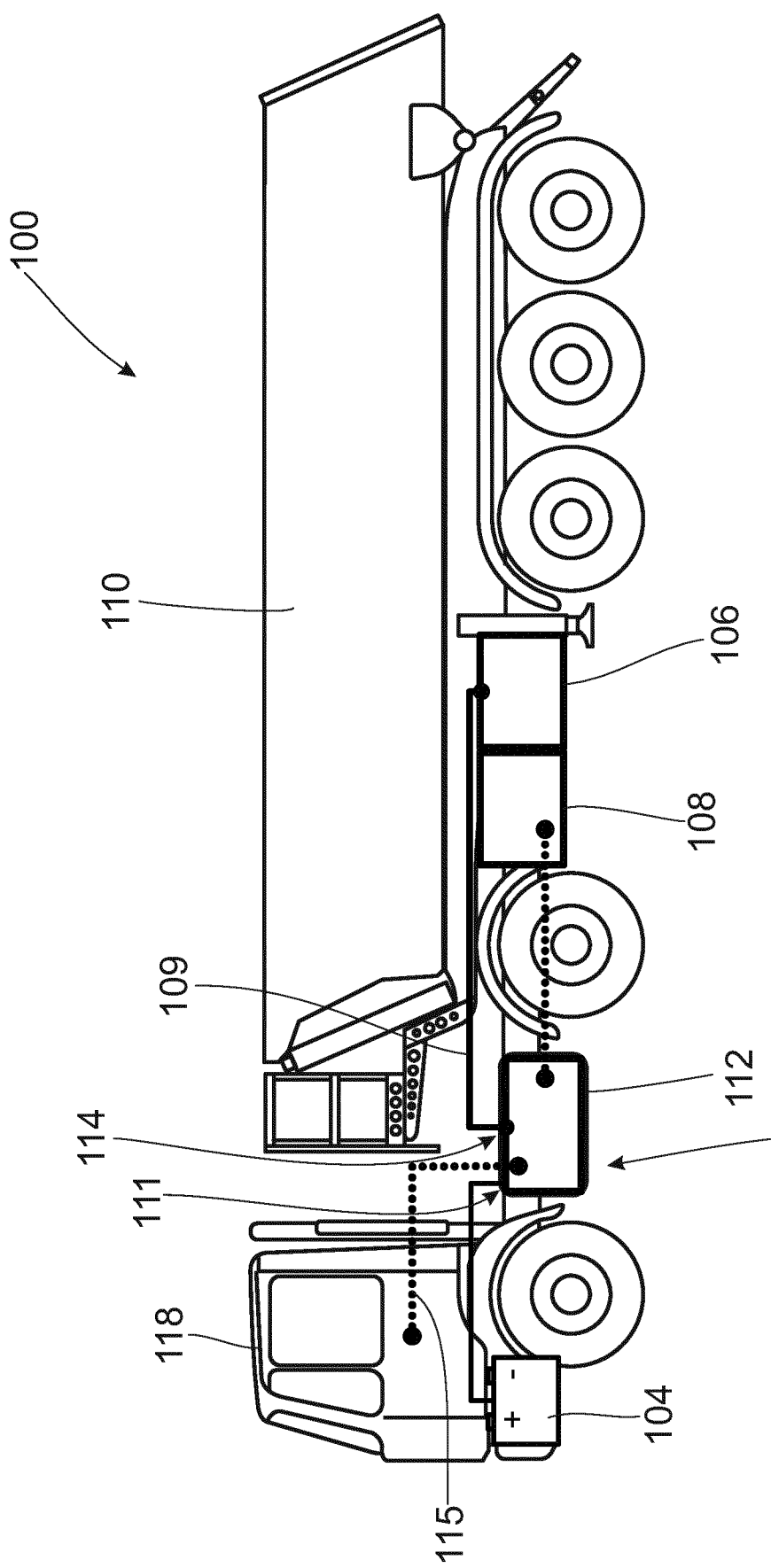
FIG. 1 is a schematic illustration of an electric vehicle.

FIG. 1 shows a schematic illustration of an electric vehicle 100 according to an exemplary embodiment. The electric vehicle 100 here takes the form of an electrified truck, for example with a grinding mill or, for example, a concrete pump. The electric vehicle 100 has an apparatus 102, a vehicle battery 104, an auxiliary drive 106, and, entirely optionally, a hydraulic device 108. The apparatus 102 is here designed to supply operating energy 109 for the auxiliary drive 106. The vehicle battery 104 is designed to supply, for example, drive energy for the electric vehicle 100. According to this exemplary embodiment, the auxiliary drive 106 is designed to drive or move the hydraulic device 108. According to this exemplary embodiment, the hydraulic device 108 takes the form of a hydraulic pump by which, for example, a vehicle body 110 of the electric vehicle 100 is moved.

The apparatus 102, as illustrated in more detail in one of the following Figures, here has a battery interface 111 designed to connect the apparatus 102 to the vehicle battery 104. The apparatus 102 furthermore has an inverter 112 which has a first connector (not depicted here) and a second connector. The inverter 112 is connected to the battery interface 111 by the first connector. The inverter 112 is optionally implemented as bidirectional. It is designed to convert a direct voltage present at the first connector into an alternating voltage for a boost function and supply it to the first connector. The boost function is here initiated in response to a boost signal. The apparatus 102 likewise has a switch device (not illustrated here) with a switch connector, an auxiliary interface 114, and a charging interface as well as a control device (also not illustrated). The switch device, as described in detail in one of the following Figures, is here designed to connect the switch connector to the auxiliary interface 114 and the charging interface using a switch signal 205. The switch connector is designed to connect the second connector of the inverter 112 to the switch device. The apparatus 102 is connected to the auxiliary drive 106 via the auxiliary interface 114. The charging interface is designed to feed electrical energy into the apparatus 102. The control device is designed to supply the boost signal for the boost function when a current energy value of the electrical energy is less than a target value for the operating energy 109. The control device is furthermore designed to supply an idle signal for deactivating the inverter 112 when the current energy value of the electrical energy is greater than or equal to the target value for the operating energy 109. According to this exemplary embodiment, it is, for example, possible for a driver of the electric vehicle 100, using an operating device from a driver's cab 118 of the electric vehicle 100, to supply an operating signal 115 which can be used by the control device of the apparatus 102 to control the inverter and/or the switch device.

Auxiliary drive options have resulted from the change to electrically driven commercial vehicles, which are here referred to as electric vehicles 100. Bodybuilders that create work functions need to provide a new interface for operating the truck bodies. According to an exemplary embodiment, the new interface used is the vehicle battery 104. In order to draw energy from the vehicle battery 104 and, for example, operate a three-phase motor, which is here referred to as the auxiliary drive 106, the inverter 112 is required. According to this exemplary embodiment, the possibility is presented of performing stationary work functions of such an electric vehicle 100 which require cranes, concrete pumps, work platforms, or grinding mills and at the same time of conserving the vehicle battery 104. Against this background, a multifunctional apparatus 102 is proposed that receives power from, for example, a power network in order to carry out a work function. According to this exemplary embodiment, it is possible to make additional power available for the work function via the battery interface 110 by the boost function.

The main function of the apparatus 102 is according to this exemplary embodiment to convert the electrical energy into various other forms of electrical energy in order to supply current to drives such as, for example, the auxiliary drive 106 and/or to charge and protect the vehicle battery 104. For example, mechanical devices, hydraulic devices 108, or pneumatic devices can be actuated by the auxiliary drive 106.

In other words, against this background, an electrified commercial vehicle is described that has a multifunctional inverter, which is described here as an apparatus 102. The apparatus 102 is used to operate at least one work function of the electric vehicle 100. For example, the apparatus 102 makes it possible to perform the work function, i.e. to drive the auxiliary drive 106, and optionally a charging function by means of which, for example, the vehicle battery 104 is charged. Furthermore, an auxiliary function of supplying a microgrid for, for example, 230V/400V is optionally enabled. By connecting the charging interface to, for example, a power source and the auxiliary interface 114, the electrical energy is supplied directly to the auxiliary drive 106, which takes the form, for example, of an electric motor, without the vehicle battery 104, which is also referred to as a battery system, being required. According to this exemplary embodiment, for the boost function, boost energy is additionally drawn from the vehicle battery 104 in parallel to the actuation of the auxiliary drive 106 and supplied for the auxiliary drive 106. For this purpose, the inverter 112 has a mains-synchronized design. A current value of the direct voltage present at the first connector is variable according to this exemplary embodiment.

Figure 2:
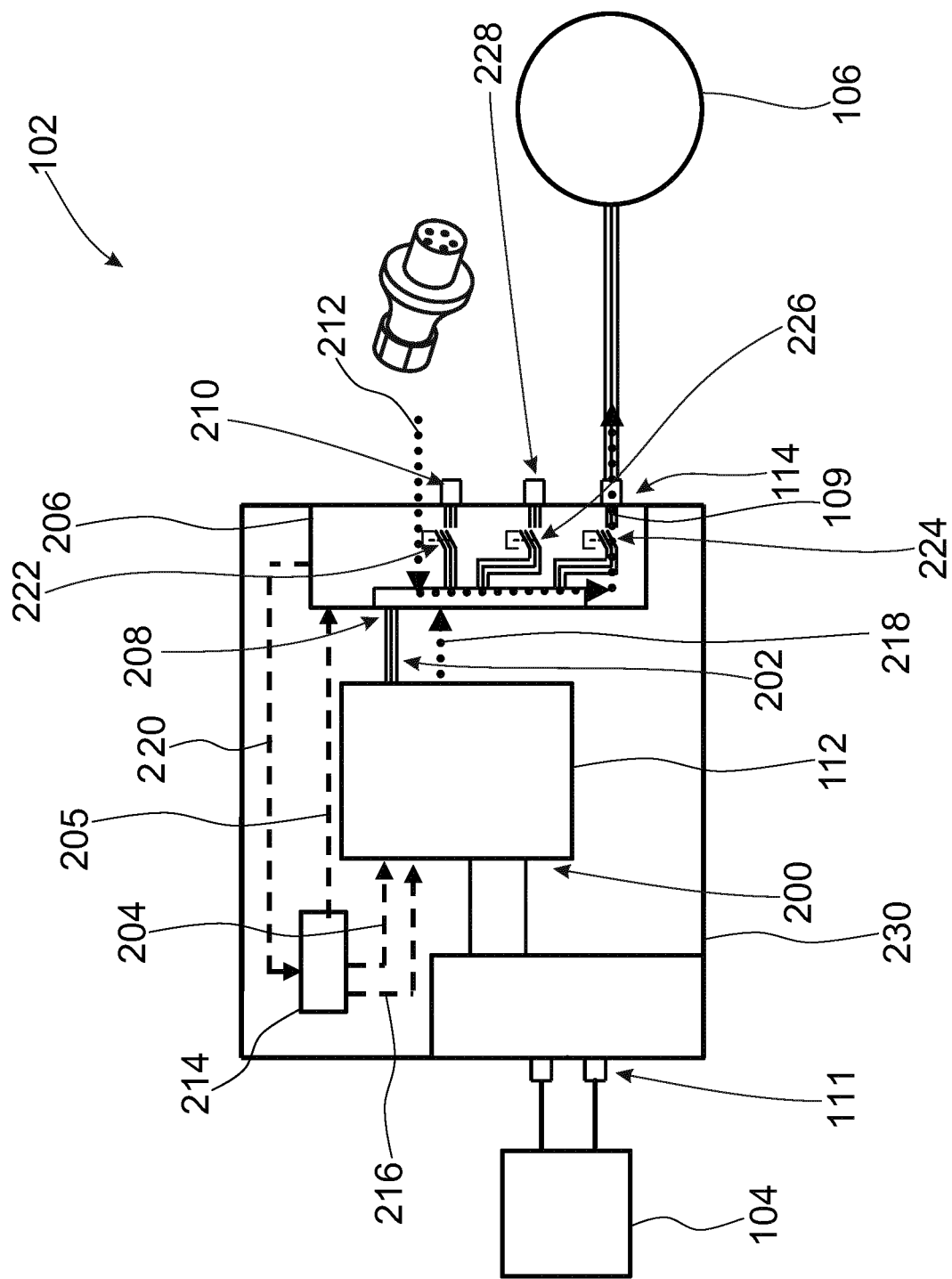
FIG. 2 is a schematic illustration of an apparatus for supplying operating energy for an auxiliary drive.

FIG. 2 shows a schematic illustration of an apparatus 102 for supplying operating energy 109 for an auxiliary drive 106 according to an exemplary embodiment. The apparatus 102 illustrated here can correspond to or at least be similar to the apparatus 102 described in FIG. 1 and accordingly is or can be employed in an electric vehicle, as was described in FIG. 1. The inverter 112 has the first connector 200 for connecting the inverter 112 to the battery interface 111, and the second connector 202. The battery interface 111 is designed to connect the apparatus 102 to the vehicle battery 104. The inverter 112 here too has the first connector 200 and the second connector 202, wherein the first connector 200 is connected to the battery interface 111. The inverter 112 is designed to convert a direct voltage present at the first connector 200 into an alternating voltage for the boost function in response to the boost signal 204 and to supply it to the second connector 202. The switch device 206 already mentioned in FIG. 1 is also implemented in FIG. 2 as part of the apparatus 102. The switch device 206 here too has the switch connector 208 that connects the switch device 206 to the second connector 202. The switch device furthermore has the auxiliary interface 114 for connecting the apparatus 102 to the auxiliary drive 106, and the charging interface 210 for feeding the electrical energy 212 into the apparatus 102. As also described in FIG. 1, the switch device 206 is designed to connect the charging interface 210 to the switch connector 208 and the auxiliary interface 114 using a switch signal 205 and consequently supply, for example, the operating energy 109 for the auxiliary drive. The electric vehicle 100 according to an exemplary embodiment is here stationary.

As also is the case for the apparatus 102 described in FIG. 1, the apparatus 102 described here also has the control device 214. The control device 214 is designed to supply the boost signal 204 for the boost function, as depicted here, when a current energy value of the electrical energy 212 present at the charging interface 210 is less than a target value for the operating energy 109. The control device 214 is furthermore designed to supply an idle signal 216 for deactivating the inverter 112 when the current energy value of the electrical energy 212 is greater than or equal to the target value for the operating energy 109. In other words, the idle signal 216 causes the inverter 112 to run, for example, in idle mode. According to this exemplary embodiment, however, the boost function is depicted in FIG. 2. According to this exemplary embodiment, the boost function causes boost energy 218 stored in the vehicle battery 104 to be supplied to the auxiliary interface 114 in order to reach the target value of the operating energy 109. The current energy value can be measured, for example, by means of a detection device such as, for example, a power meter. As an option, the control device 214 supplies the boost signal 204 when a current speed of the auxiliary drive 106 is less than a target speed of the auxiliary drive 106. A tachometer is, for example, used for this purpose. Furthermore, the control device 214 is optionally designed to read a phase signal 220. The phase signal here represents a charging current which is present, for example, at the charging interface 210. The control device 214 accordingly supplies the boost signal 204 using the phase signal 220. Undesired mutual influencing of an incoming alternating voltage of the electrical energy 212 and the alternating voltage, converted by the inverter 112, of the boost energy is prevented as a result.

According to this exemplary embodiment, the switch device 206 has, entirely optionally, a first switch 222 and a second switch 224. The first switch 222 is here designed to connect the switch connector 208 to the charging interface 210. The second switch 224 is designed to connect the switch connector 208 to the auxiliary interface 114. According to this exemplary embodiment, the connection between the charging interface 210 and the auxiliary interface 114 is established when the closing of the switches 222, 224 is effected by the switch signal 205. According to this exemplary embodiment, the switch device 208 has, entirely optionally, a third switch 226, which is connected to a likewise optional current-supply interface 228 for supplying current to an appliance coupled to the current-supply interface 228. In this case, the switch device 206 is designed to connect the switch connector 208 to the charging interface 210, the auxiliary interface 114, and/or the current-supply interface 228 likewise using the switch signal 205.

According to an alternative exemplary embodiment, the switch device 206 additionally has a drive interface for supplying current to a drive motor, connected to the drive interface, of the electric vehicle. The drive motor is accordingly designed to drive the electric vehicle, i.e. to enable a travel function. The switch device 206 is therefore likewise designed to connect the switch connector 208 to the drive interface, the auxiliary interface 114, or the charging interface 210. It is furthermore conceivable according to an alternative exemplary embodiment that the inverter 112 is designed to convert an alternating voltage present at the second connector 202 into a direct voltage in response to a charging signal (not shown here) and to supply the direct voltage to the first connector 200. A charging function for the vehicle battery 104 is, for example, enabled as a result. The inverter 112, the switch device 206, and the control device 214 are optionally arranged in a common housing 230.

In other words, according to this exemplary embodiment, the auxiliary drive 106 is powered via, for example, a socket outlet connected to the charging interface 210. In the case of a relatively high power demand, the boost energy 218 is drawn from the vehicle battery 104 and made available to the work application, i.e. the auxiliary drive 106, by the inverter 112 in order to have in total the required operating energy 109. In order to be able to do this without delay, the inverter 112 according to this exemplary embodiment is mains-synchronized during the powering of the auxiliary drive 106.

The operating energy 109 or operating power thus corresponds to the total of the fed-in electrical energy 212 or fed-in electrical power at the charging interface 210 and the boost energy 218 or boost power.

For example, a concrete pump can be operated in mains operation with boosts via the vehicle battery 104. The required peak power for this application is approximately 150 kW. A connector at the construction site consists, for example, of a 125A CEE outlet with 87 kW. The concrete pump has a 176 kW inverter in the apparatus 102 and an electric motor as the auxiliary drive 106. The auxiliary drive 106 is powered via the CEE outlet. When there is a demand for more power, energy is drawn from the vehicle battery 104 and made available additionally to the work application in order to have in total the required power. So that the inverter 112 in the form of a vehicle inverter can do this quickly, it runs in a mains-synchronized fashion whilst being powered from the mains (50 Hz). The mobile concrete pump can also run independently of the mains via the vehicle battery 104 and the inverter 112, configured as a 176 kW inverter, and the auxiliary drive 106 in the form of the electric motor.

According to an exemplary embodiment, the housing 230 has external connectors for forming the battery interface 111, the charging interface 210, the auxiliary interface 114, and optionally the current-supply interface 228.

For example, the vehicle battery 104 is configured as a 650 VDC high-voltage battery and the battery interface 111 comprises high-voltage connectors. The inverter 112 is configured by way of example as a DC/AC inverter. The bidirectionality of the inverter 114 applies, for example, to the operation of the auxiliary drive 106, 400 VAC, and the charging. The charging interface 210 takes the form of, for example, a 3AC charging connector and the current-supply interface 228 takes the form, for example, a 400 VAC/50 Hz output.

Figure 3:
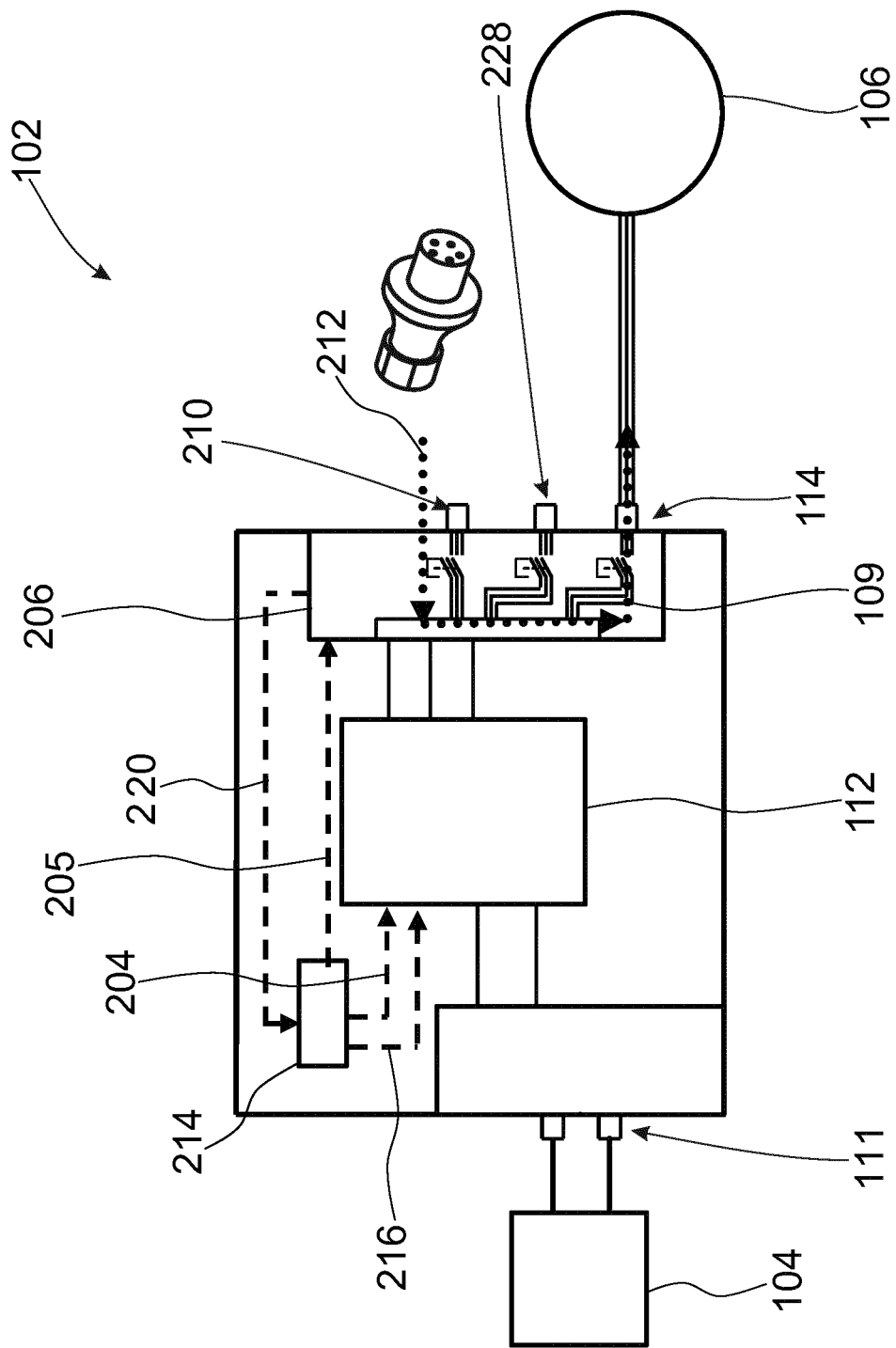
FIG. 3 is a schematic illustration of an apparatus for supplying operating energy for an auxiliary drive.

FIG. 3 shows a schematic illustration of an apparatus 102 for supplying operating energy 109 for an auxiliary drive 106 according to an exemplary embodiment. The apparatus 102 illustrated here can correspond to or at least be similar to the apparatus 102 described in FIG. 2 and is arranged in an electric vehicle as was described in FIG. 1. According to this exemplary embodiment, the boost function is deactivated, in contrast to the apparatus 102 described in FIG. 2. According to this exemplary embodiment, the charging interface 210 and the auxiliary interface 114 are connected to each other using the switch signal 205 such that the electrical energy 212 is fed in via the charging interface 210 and supplied to the auxiliary drive 106 via the auxiliary interface 114. According to this exemplary embodiment, the inverter 112 is in idle mode by the idle signal 216, as a result of which the apparatus 102 illustrated here differs from the apparatus 102 illustrated in FIG. 2. This means that the inverter 112 according to this exemplary embodiment is, for example, switched off or is, for example, in standby.

The operating energy 109 or operating power thus corresponds to the electrical energy 212 fed in at the charging interface 210.

Use of the mains connector present at the work location to power the work function using the apparatus 102 is advantageously possible. The auxiliary function optionally consists in the possibility of providing a "boost" by means of the vehicle battery 104 present. This makes it possible to cover power peaks above the available mains power. For example, during mains operation without boosting by the vehicle battery 194, a grinding mill has an assumed power demand of 75 kW. The connector at the farm consists of a 125A CEE outlet (=87 kW). The auxiliary drive 106 in the form of an electric motor can thus be powered exclusively via the CEE outlet in order to operate the grinding mill. The vehicle battery 104 is therefore not required.

Figure 4:
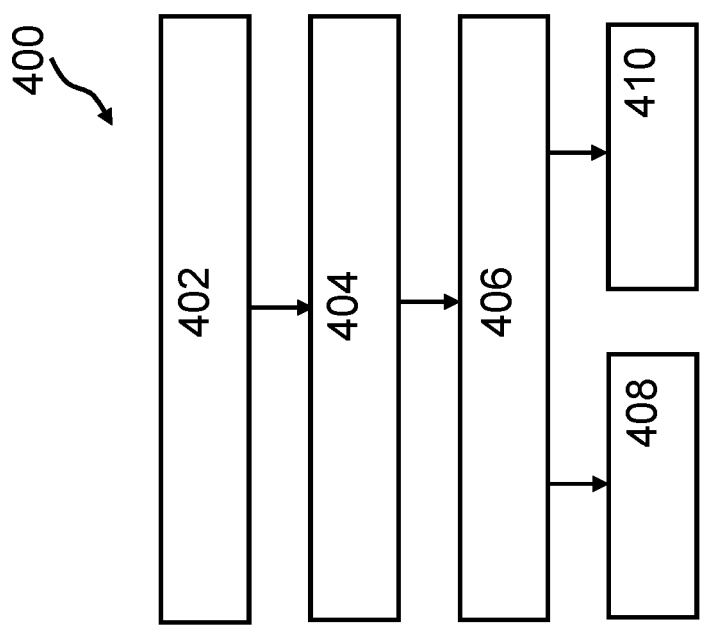
FIG. 4 is a flow diagram of a method for supplying operating energy for an auxiliary drive.

FIG. 4 shows a flow diagram of a method 400 for supplying operating energy for an auxiliary drive according to an exemplary embodiment. The method can be performed, for example, in an electric vehicle, as was described in FIG. 1. The method 400 can furthermore be applied for an apparatus of the electric vehicle, as was described in one of FIG. 1 or 2. The method 400 comprises a step 402 of converting a direct voltage present at the first connector into an alternating voltage for the boost function in response to the boost signal, and a step 404 of supplying the alternating voltage to the second connector. The method 400 furthermore comprises a step 406 of connecting the switch connector to the second connector, to the auxiliary interface, and/or to the charging interface using the switch signal. In a supply step 408, the boost signal for the boost function is supplied when a current energy value of the electrical energy present at the charging interface is less than a target value for the operating energy. In a supply step 410, the idle signal for deactivating the inverter is supplied when the current energy value of the electrical energy present at the charging interface is greater than or equal to the target value for the operating energy.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. An apparatus configured to supply operating energy for an auxiliary drive of an electric vehicle, comprising:
    a battery interface configured to connect the apparatus to a vehicle battery of the electric vehicle;
    an inverter with a first connector for connecting the inverter to the battery interface, and a second connector, wherein the inverter is configured to convert direct voltage present at the first connector into an alternating voltage for a boost function in response to a boost signal and to supply it to the second connector;
    a switch device comprising:
        a switch connector which connects the switch device to the second connector of the inverter;
        an auxiliary interface configured to connect the apparatus to the auxiliary drive; and
        a charging interface configured to feed electrical energy into the apparatus,
        wherein the switch device is configured to connect the charging interface to the switch connector and to the auxiliary interface using a switch signal;
    a control device configured to supply the boost signal for the boost function when a current energy value of the electrical energy present at the charging interface is less than a target value for the operating energy, and to supply an idle signal to deactivate the inverter when the current energy value of the electrical energy present at the charging interface is greater than or equal to the target value for the operating energy,
    wherein the control device is designed to read a phase signal which represents a phase position of a charging current present at the charging interface and is designed to supply the boost signal using the phase signal.

2. The apparatus as claimed in claim 1, wherein the control device is configured to supply the boost signal when a current speed of the auxiliary drive is less than a target value of the auxiliary drive.

3. The apparatus as claimed in claim 1, wherein the switch device has a first switch configured to connect the switch connector to the charging interface, and a second switch configured to connect the switch connector to the auxiliary interface.

4. The apparatus as claimed in claim 3, wherein the switch device is configured to close the first switch and the second switch using the switch signal.

5. The apparatus as claimed in claim 1, wherein the switch device has a current-supply interface configured to supply current to an appliance coupled to the current-supply interface, and wherein the switch device is configured to connect the switch connector to the charging interface, the auxiliary interface, and/or the current-supply interface using the switch signal.

6. The apparatus as claimed in claim 1, wherein the inverter, the switch device, and the control device are arranged in a common housing.

7. The apparatus as claimed in claim 1, wherein the inverter is designed to convert alternating voltage present at the second connector into a direct voltage in response to a charging signal and to supply it to the first connector for a charging function of the vehicle battery.

8. The apparatus as claimed in claim 1, wherein the switch device has a drive interface configured to supply current to a drive motor, connected to the drive interface, of the electric vehicle, and wherein the switch device is configured to connect the switch connector to the drive interface or the auxiliary interface or the charging interface using the switch signal.

9. An electric vehicle comprising:
    a vehicle battery;
    an auxiliary drive; and
    an apparatus configured to supply operating energy for an auxiliary drive of an electric vehicle, comprising:
        a battery interface configured to connect the apparatus to the vehicle battery of the electric vehicle;
        an inverter with a first connector for connecting the inverter to the battery interface, and a second connector, wherein the inverter is configured to convert direct voltage present at the first connector into an alternating voltage for a boost function in response to a boost signal and to supply it to the second connector;
        a switch device comprising:
        a switch connector which connects the switch device to the second connector of the inverter;
        an auxiliary interface configured to connect the apparatus to the auxiliary drive; and
        a charging interface configured to feed electrical energy into the apparatus,
        wherein the switch device is configured to connect the charging interface to the switch connector and to the auxiliary interface using a switch signal;
        a control device configured to supply the boost signal for the boost function when a current energy value of the electrical energy present at the charging interface is less than a target value for the operating energy, and to supply an idle signal to deactivate the inverter when the current energy value of the electrical energy present at the charging interface is greater than or equal to the target value for the operating energy,
    wherein the vehicle battery connected to the battery interface, and the auxiliary drive connected to the auxiliary interface,
    wherein the control device is designed to read a phase signal which represents a phase position of a charging current present at the charging interface and is designed to supply the boost signal using the phase signal.

10. A method for supplying operating energy for an auxiliary drive for an electric vehicle electric vehicle having a vehicle battery; an auxiliary drive; and an apparatus configured to supply operating energy for an auxiliary drive of an electric vehicle, comprising: a battery interface configured to connect the apparatus to the vehicle battery of the electric vehicle; an inverter with a first connector for connecting the inverter to the battery interface, and a second connector, wherein the inverter is configured to convert direct voltage present at the first connector into an alternating voltage for a boost function in response to a boost signal and to supply it to the second connector; a switch device comprising:
    a switch connector which connects the switch device to the second connector of the inverter; an auxiliary interface configured to connect the apparatus to the auxiliary drive; and a charging interface configured to feed electrical energy into the apparatus, wherein the switch device is configured to connect the charging interface to the switch connector and to the auxiliary interface using a switch signal; a control device configured to supply the boost signal for the boost function when a current energy value of the electrical energy present at the charging interface is less than a target value for the operating energy, and to supply an idle signal to deactivate the inverter when the current energy value of the electrical energy present at the charging interface is greater than or equal to the target value for the operating energy, wherein the vehicle battery connected to the battery interface, and the auxiliary drive connected to the auxiliary interface, the method comprising:

converting a direct voltage present at the first connector into the alternating voltage for the boost function in response to the boost signal, and supplying the alternating voltage to the second connector;

connecting the switch connector to the second connector, to the auxiliary interface, and/or to the charging interface, using the switch signal; and supplying the boost signal for the boost function when a current energy value of the electrical energy present at the charging interface is less than a target value for the operating energy, and supplying the idle signal for deactivating the inverter when the current energy value of the electrical energy present at the charging interface is greater than or equal to the target value for the operating energy, wherein the control device is designed to read a phase signal which represents a phase position of a charging current present at the charging interface and is designed to supply the boost signal using the phase signal.

* * * * *